United States Patent
Nandigam

(10) Patent No.: US 12,402,100 B2
(45) Date of Patent: Aug. 26, 2025

(54) NOTIFICATIONS ON A MANAGING DEVICE

(71) Applicant: T-Mobile USA, Inc., Bellevue, WA (US)

(72) Inventor: Anjani Nandigam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 481 days.

(21) Appl. No.: 17/980,245

(22) Filed: Nov. 3, 2022

(65) Prior Publication Data

US 2024/0155555 A1     May 9, 2024

(51) Int. Cl.
*H04W 8/18* (2009.01)
*H04W 4/24* (2018.01)
*H04W 68/00* (2009.01)

(52) U.S. Cl.
CPC .......... *H04W 68/005* (2013.01); *H04W 4/24* (2013.01); *H04W 8/183* (2013.01)

(58) Field of Classification Search
None
See application file for complete search history.

(56) References Cited

U.S. PATENT DOCUMENTS

| | | | |
|---|---|---|---|
| 7,983,704 B2 | 7/2011 | Weigele | |
| 8,391,832 B2 | 3/2013 | Gonzalez et al. | |
| 8,478,238 B2 | 7/2013 | Mohammed et al. | |
| 8,725,140 B2 | 5/2014 | Mohammed et al. | |
| 9,462,453 B2 | 10/2016 | Mohammed et al. | |
| 9,572,015 B2 | 2/2017 | Marquardt | |
| 9,635,541 B2 | 4/2017 | Chong et al. | |
| 9,735,821 B2 | 8/2017 | Vecera et al. | |
| 9,756,045 B2 | 9/2017 | He et al. | |
| 9,860,750 B2 | 1/2018 | Goel et al. | |
| 9,940,141 B2 | 4/2018 | Li et al. | |
| 10,165,437 B2 | 12/2018 | Wozniac et al. | |
| 10,178,223 B1 | 1/2019 | Marimuthu | |
| 10,356,604 B2 | 7/2019 | Namiranian | |
| 11,102,017 B2 | 8/2021 | Yang et al. | |
| 2004/0192386 A1 | 9/2004 | Aerrabotu et al. | |
| 2005/0075106 A1 | 4/2005 | Jiang | |
| 2021/0112399 A1* | 4/2021 | Gopal | H04L 5/0048 |

FOREIGN PATENT DOCUMENTS

| | | |
|---|---|---|
| CN | 111010691 A | 4/2020 |
| CN | 107547737 B | 7/2020 |
| CN | 107105385 B | 10/2020 |
| CN | 112055424 A | 12/2020 |
| CN | 108886683 B | 3/2021 |

(Continued)

*Primary Examiner* — Gary Lafontant
(74) *Attorney, Agent, or Firm* — Perkins Coie LLP

(57) ABSTRACT

The document describes techniques, apparatuses, and systems for providing notifications on a managing device. A first device may include a first subscriber identity module (SIM) that is at least partially managed by a second device having a second SIM. Activity associated with the first SIM may be monitored to determine if any activity associated with the first SIM is worthy of notifying the second device. If it is determined that the activity is worthy of notifying the second device, a notification indicative of the activity associated with the first SIM is transmitted to the second device. In this way, a managing device may be notified of activity on a managed device.

20 Claims, 6 Drawing Sheets

(56) References Cited

FOREIGN PATENT DOCUMENTS

| CN | 112534839 | A  | 3/2021 |
| CN | 110945888 | B  | 7/2022 |
| EP | 1345403   | B1 | 6/2005 |
| EP | 3117640   | B1 | 8/2018 |
| EP | 3639540   | A1 | 4/2020 |
| KR | 102361211 | B1 | 2/2022 |
| WO | 2016005795 | A1 | 1/2016 |

* cited by examiner

NOTIFICATIONS ON A MANAGING DEVICE

BACKGROUND

A parent device and a child device may be paired with one another to configure the child device with certain functionality that can provide communication capability, network access, or entertainment to the user. For example, a user can utilize the child device to receive messages or calls, access the internet, or execute applications. In this way, the child device can be used to perform some of the functions provided by the parent device. In some cases, the child device can be used as a functioning device without requiring use of the parent device. The parent device can manage certain capabilities of the child device to control the ways in which it is used.

BRIEF DESCRIPTION OF THE DRAWINGS

Detailed descriptions of implementations of the present invention will be described and explained through the use of the accompanying drawings.

Figure 1:
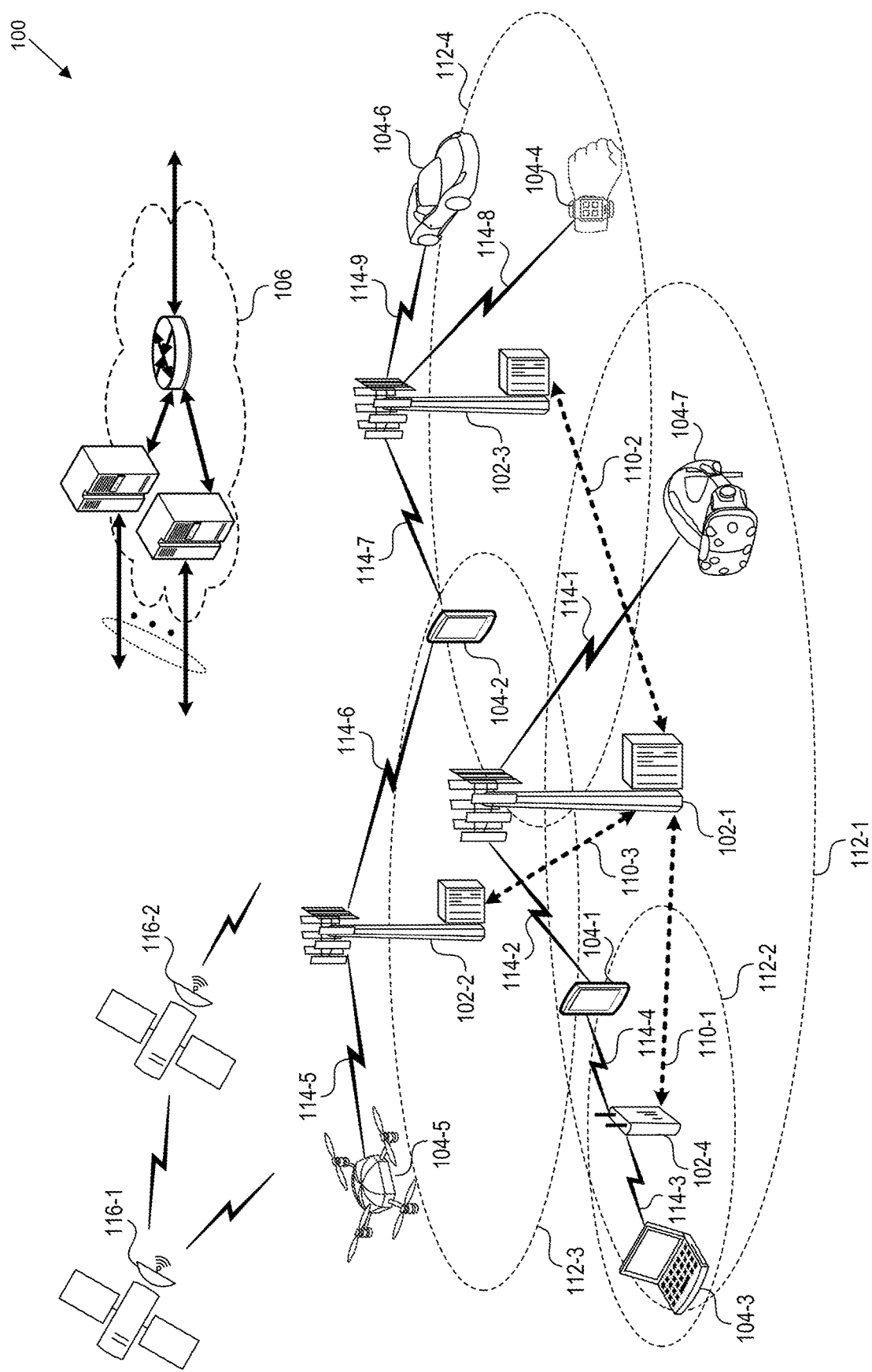
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Modern electronic devices have become increasingly connected to one another, which has enabled different types of relationships between devices. With this increase in connectivity between devices comes a corresponding need to communicate device information between the connected devices. For example, a parent device (e.g., a mobile device) can be paired with a child device (e.g., a wearable device) through a mobile network provided by a mobile network provider. The parent device and the child device can each be capable of communicating over the mobile network. In some cases, the child device can be provisioned as a standalone device that is capable of calling and messaging using the mobile network independent of the parent device. The child device can be provisioned with a first subscriber identity module (SIM) that is managed by a second device having a second SIM. For example, the parent device can be used to provision the child device, and the parent device can specify the capabilities of the child device (e.g., what services may be used).

In some implementations, a parent device can be incapable of monitoring a child device after the child device is provisioned or the monitoring can be inefficient to communicate relevant information about the child device to the parent device. For example, a parent device may not be informed if a SIM at the child device is deleted, thereby disabling the child device from communicating on the network. Moreover, the child device can incur excess charges or alter characteristics of a billing account that is relevant to a user of the parent device. In some cases, this can cause the child device to become disconnected from the network (e.g., due to a failed bill payment or insufficient funds) without the parent device ever being notified. Thus, a parent device can lose connectivity with a child device without ever being notified of this disconnection.

To solve these issues and others, the techniques, apparatuses, and systems described herein can monitor the activity of the child device. The activity can be stored and analyzed to determine if the activity is worthy of notifying the parent device. In this way, the parent device can receive notifications about specific activity on a child device. In some implementations, the parent device or the mobile network provider can determine which activity is worthy of notifying the parent device. As non-limiting examples, the activity worthy of notifying the parent device can include activity related to the mobile network operator billing for services associated with the first SIM and provided by the mobile network operator (e.g., alterations to a billing profile that is billed for services associated with the first SIM, insufficient funds on the billing profile, special service charges associated with the first SIM, etc.), a deletion of the first SIM from the child device (e.g., disabling the child device from communicating on the network), or a change to how the child device is managed (e.g., provisioning a different device to at least partially manage the child device).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL)

transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
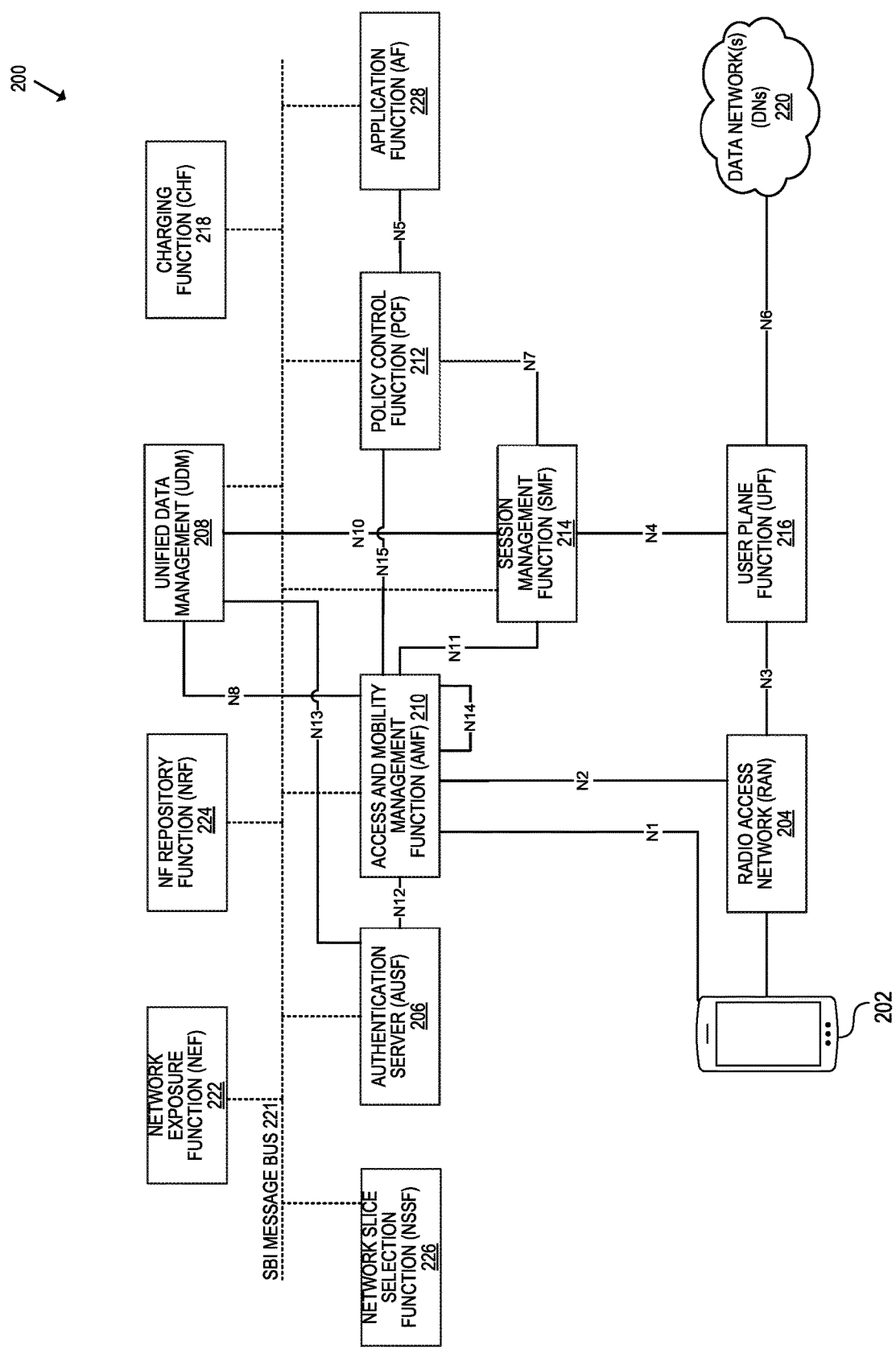
FIG. 2 is a block diagram that illustrates 5G core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions.

The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Paired Devices

Figure 3:
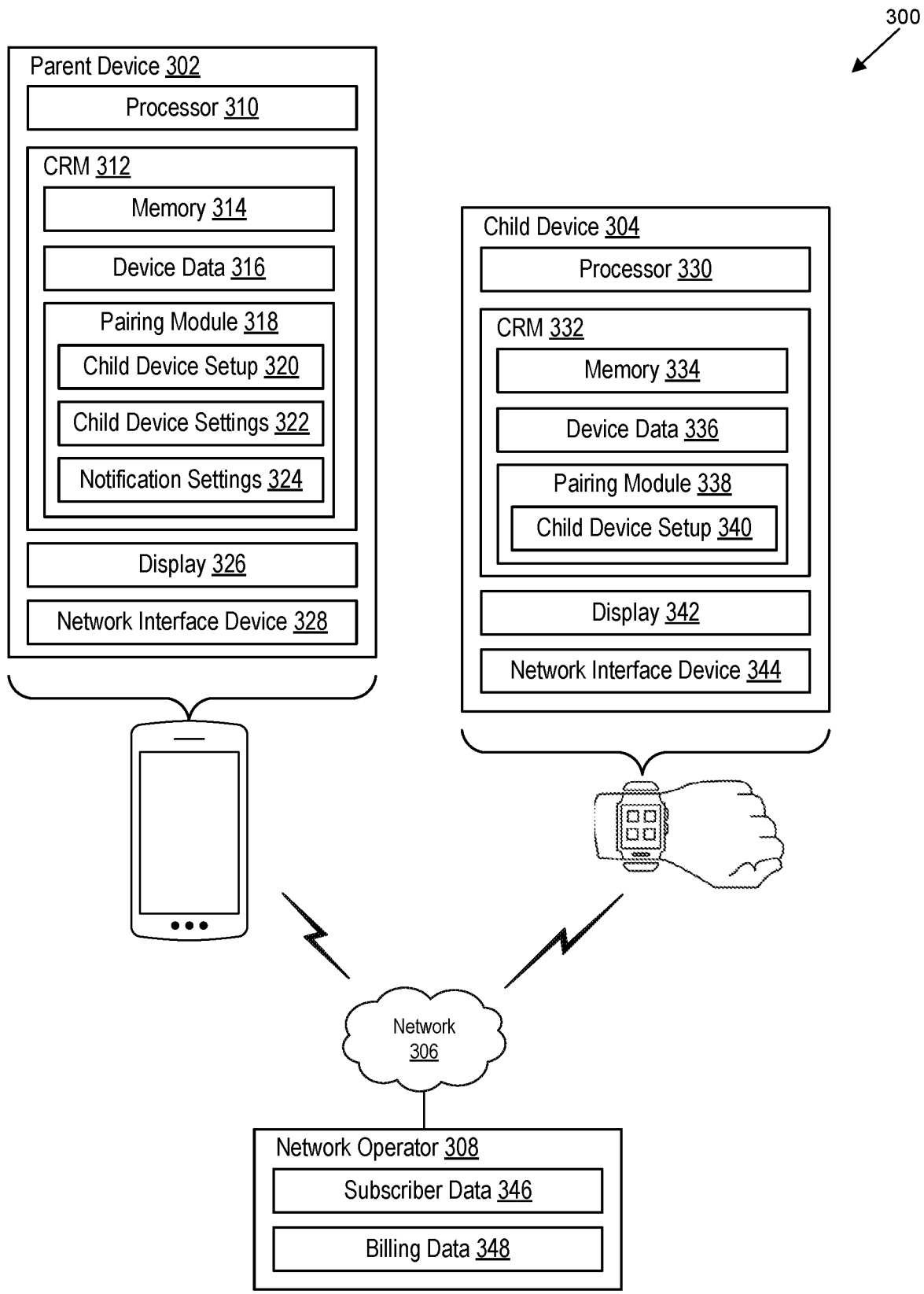
FIG. 3 is a block diagram that illustrates a parent device and a child device that can implement aspects of the present technology.

FIG. 3 is a block diagram that illustrates an example configuration 300 of a parent device 302 paired with a child device 304 through a network 306 provided by a network operator 308. Although illustrated as a mobile device, the parent device 302 can be any appropriate electronic device, including a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions. Although illustrated as a wearable device, the child device 304 can similarly include any of the aforementioned devices. As illustrated, the parent device 302 can include at least one processor 310 that executes computer-readable instructions on at least one computer-readable storage medium 312, which excludes transitory signals. The computer-readable storage medium 312 can include memory media 314, for example, non-volatile memory, volatile memory, flash memory, etc.

The computer-readable storage medium 312 can include device data 316. The device data 316 can include any data relating to the parent device 302, the network operator 308, or a device paired with the parent device 302 (e.g., child device 304). For example, the device data 316 can include data related to a subscriber to the network 306 on the parent device 302 (e.g., a SIM). The parent device 302 can include an integrated universal circuit card (IUCC) to enable an embedded SIM (eSIM) to be installed on the parent device 302. Alternatively, the parent device 302 can include a physical SIM. The device data 316 can include information related to a subscriber on a paired device, for instance, the child device 304.

The computer-readable storage medium 312 can include a pairing module 318 that enables the child device 304 to be paired to the parent device 302. The pairing module 318 can include child device setup instructions 320 that enable a subscriber on the child device 304 to be provisioned using the parent device 302. The child device setup instructions 320 can create a SIM at the child device 304. In aspects, the child device 304 can include an IUCC, and the SIM can include an eSIM installed thereon. The child device 304 can be paired to the parent device 302 through the network 306. In contrast to proximity-based pairing (e.g., Bluetooth®, near-field communication (NFC), etc.), the child device 304 can pair to the parent device 302 through the network 306 provided by the network operator 308. Thus, the parent device 302 and the child device 304 may not need to be within a certain proximity to remain connected after the child device 304 has been provisioned. Moreover, the parent device 302 can monitor activity of the child device 304 regardless of the specific operating systems executing on the devices. The parent device 302 or the subscriber of the parent device 302 can at least partially manage the child device 304 or the subscriber on the child device 304. For instance, the parent device 302 can be used to provision the child device 304, and the parent device 302 can be privileged to control or monitor the activity of the child device 304. In some instances, the parent device 302 can control the applications or services available to the child device 304 (e.g., during particular time windows). Alternatively or additionally, the parent device 302 can have access to information related to the usage, subscriptions, or location of the child device 304.

The pairing module 318 can include child device settings 322 that are used to provision the child device 304. The parent device 302 or the child device 304 can communicate (e.g., via call or message) over the network 306. The child device 304 can be provisioned in a "standalone" mode or a "digital pairing" mode. In the "standalone" mode, the child device 304 can have calling and messaging capability independent of the parent device 302. For example, the child device 304 can transmit and receive calls and messages using a different mobile number than the parent device 302. In this way, the child device 304 can be given to a different user than the parent device 302. In the "digital pairing" mode, the child device 304 can act as a duplicate device to the parent device 302. For instance, any calls or messages that are received by the parent device 302 can be received by the child device 304. The parent device 302 and the child device 304 can transmit and receive calls and messages under a same mobile number. In this way, the parent device 302 and the child device 304 can be utilized by a same user in the "digital pairing" mode. In some implementations, the child device settings 322 can define which services are to be enabled or disabled on the child device 304 during provisioning. The child device settings 322 can be configured by the user of the parent device 302 or by the network operator 308.

In some implementations, the pairing module 318 can include notification settings 324 that define the types of notifications received from the child device 304. For instance, the parent device 302 can receive notifications based on activity of the child device 304 (e.g., activity associated with the subscriber provisioned on the child device 304), and the notification settings 324 can specify types of activity that are worthy of providing notifications to the parent device 302. As non-limiting examples, the notification settings 324 can pair the parent device 302 and the child device 304 such that notifications are sent to the parent device 302 for activity related to billing, SIM deletion, or device management. Similar to the child device settings 322, the notification settings 324 can be configured by the user of the parent device 302 or by the network operator 308.

The parent device 302 can include a display 326 for presenting information (e.g., notifications from the child device 304) to a user of the device. The display 326 can be a touch-screen display to enable interaction with the user thereat. The parent device 302 can include a network interface device 328 that enables the parent device 302 to mediate data in a network 306 with an entity that is external to the parent device 302 through any communication protocol supported by the parent device 302, the external entity, and the network 306. Examples of the network interface device 328 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The child device 304 can similarly include a processor 330 that executes computer-readable instructions on at least one computer-readable storage medium 332. The computer-readable storage medium 332 can include memory media 334, device data 336, and a pairing module 338. The memory media 334, for example, include non-volatile memory, volatile memory, flash memory, etc. The device data 316 can include any data relating to the child device 304, the network operator 308, or a device to which the child device 304 is paired (e.g., parent device 302). For example, the device data 316 can include data related to a subscriber to the network 306 on the child device 304 (e.g., a SIM). The child device 304 can include an IUCC to enable an eSIM to be installed on the child device 304, for example, during a provisioning of the child device 304 when it is paired to the parent device 302. The device data 316 can include information related to a subscriber on a paired device, for instance, the parent device 304. The pairing module 318 can enable the child device 304 to be paired to the parent device 302. The pairing module 318 can include child device setup instructions 340 that enable a subscriber on the child device 304 to be provisioned using the parent device 302. For example, the child device setup instructions 340 can provision the subscriber on the child device 304 in accordance with the child device settings 322. The child device 304 can further include a display 342 and a network interface device 344 generally similar to the display 326 and the network interface device 328 of the parent device 302.

The parent device 302 and the child device 304 can be connected to the network 306 provided by the network operator 308. The parent device 302 and the child device 304 can be paired using the network 306. The network operator 308 can manage the pairing between the parent device 302 and the child device 304. For example, the network operator 308 can store subscriber data 346 related to the pairing of devices within the network 306. The subscriber data 346 can include any information about the network subscribers or the pairing (e.g., relationship) between devices (e.g., subscribers on the devices). The subscriber data 346 can include the SIMs of various subscribers in the network. In some instances, the subscriber data 346 can include information about the provisioning of the child device 304, for example, information from the child device settings 324 or the notification settings 324. The network operator 308 can monitor activity of the child device 304 and provide the data to the parent device 302. In some implementations, the activity of the child device 304 can be retrieved from billing data 348, which includes information relating to billing subscribers for services provided by the network operator 308, or other data from the parent device 302, the child device 304, or the network operator 308. For instance, the billing data 348 can have information relating to calls or messages transmitted or received by the child device 304, the location of the child device 304, the services subscribed to by the child device 304, the billing account of the child device 304, or the like. From this information, the network operator 308 can determine that the parent device 302 should be notified based on activity at the child device 304 and transmit a notification to the parent device 302. Details of a virtual bind system for monitoring a child device 304 and transmitting notifications to a parent device 302 are described in greater detail with reference to FIG. 4.

Virtual Bind System

Figure 4:
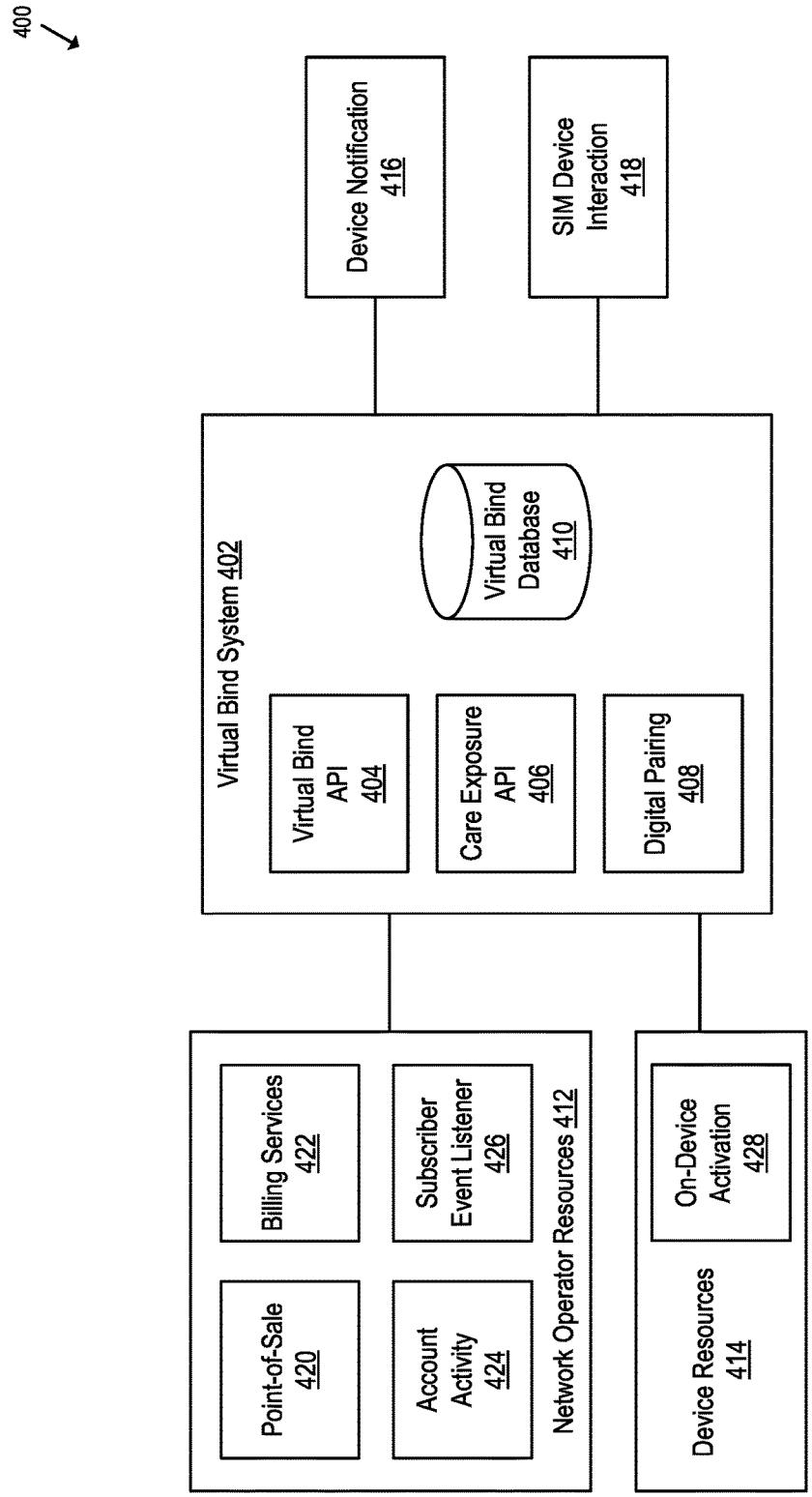
FIG. 4 is a block diagram that illustrates a virtual bind system that can implement aspects of the present technology.

FIG. 4 is a block diagram 400 that illustrates a virtual bind system 402 that can implement aspects of the present technology. The virtual bind system 402 includes a virtual bind application programmable interface (API) 404, a care exposure API 406, a digital pairing database 408, and a virtual bind database 410. The virtual bind system 402 can receive data from network operator resources 412 (e.g., information collected by the network operator) or device resources 414 (e.g., information collected by the parent device or the child device, such as by on device applications that manage the watch) and store the data in the virtual bind database 410 through the virtual bind API 404. The data can relate to activity associated with a subscriber provisioned on the child device. The data stored in the virtual bind database 410 can be analyzed to determine if the data indicative of the activity associated with the subscriber provisioned on the child device satisfies a notification criteria (e.g., a criteria set by the parent device or the network operator) and thus corresponds to a notification event. If the activity satisfies the notification criteria, a device notification 416 that is indicative of the activity can be transmitted to the parent device. In some implementations, the virtual bind system 402 can perform a SIM device interaction 418 with the parent device or the child device. For example, if the SIM corresponding to the subscriber on the child device is deleted, the virtual bind system 402 can reinstall the SIM on the child device.

The virtual bind system 402 can collect and analyze data from the network operator resources 412 or the device resources 414 to determine if activity associated with the subscriber on the child device is worthy of notifying the subscriber on the parent device. As illustrated, the network operator resources 412 can include point-of-sale data 420, billing services data 422, account activity data 424, or a subscriber event listener 426, and the device resources 414 can include on-device activation data 428. The point-of-sale data 420 can include data relating to services purchased by a subscriber to the network operator. For example, the point-of-sale data 420 can include call, message, or data limits of a subscriber to the mobile network operator. In some implementations, the point-of-sale data 420 can include information related to a purchased device that a subscriber uses to access the network (e.g., product number, device number, device type, etc.). The point-of-sale data 420 can include the SIM installed onto a device at purchase.

The billing services data 422 can include information about services provided from the network operator to the subscriber. For example, the billing services data 422 can include data related to calls, messages, or network accesses associated with a subscriber. This information can include information about an entity that initiates or receives a call, message, or network access request. For instance, the billing services data 422 can identify a mobile number that transmits or receives a call or message or a web address to which a network access request is directed. A time or location at which a call, message, or network access request is initiated can be included in the billing services data 422. In some implementations, the billing services data 422 can include data relating to billing account activity associated with a subscriber. For example, the billing services data 422 can include information related to user or payment information on a billing account that is billed, by the network operator, for services associated with a subscriber. In some implementations, the subscriber on the child device can be associated with a different billing account than a subscriber on the parent device. Thus, the billing services data 422 can enable a parent device to monitor a child device even if the billing services data 422 does not appear in the billing account associated with the subscriber on the parent device.

The account activity data 424 can include data related to an account associated with a subscriber of the network operator. The account activity data 424 can include relationships between devices or subscribers. For example, the account activity data 424 can store the SIM information for a parent and child device. The account activity data 424 can include information on a type of pairing between two devices (e.g., "standalone" mode or "digital pairing" mode). The account activity data 424 can include changes to services subscribed to by a subscriber of the network operator, for instance, call, message, or data subscriptions. The account activity data 424 can determine that the SIM installed on a child device has been deleted. In some instances, the network operator resources 412 can include a subscriber event listener 426 that monitors the point-of-sale data 420, the billing services data 422, or the account activity data 424 for data related to a subscriber of the network operator. The subscriber event listener 426 can provide this data to the virtual bind system 402 to be stored in the virtual bind database 410.

The virtual bind system 402 can also receive data from device resources 414, which can include on-device activation data 428. The on-device activation data 428 can include data stored on a device connected to a network provided by the network operator (e.g., a child device or a parent device). The on-device activation data 428 can include data related to the provisioning of a child device using a parent device or changes to relationships between a child device and a parent device. For example, the on-device activation data 428 can include a relationship between the devices or the subscribers, the SIMs associated with subscribers on the devices, the type of pairing between the child and parent device (e.g., "standalone" mode or "digital pairing" mode), or any setting the child device is provisioned with (e.g., enabled and disabled services, notification settings, etc.). In some implementations, the on-device activation data 428 can include information relating to a child device being paired to a new device (e.g., a new device at least partially manages the child device).

Once the data is stored in the virtual bind database 410, the virtual bind system 402 can determine if the activity associated with the subscriber on the child device corresponds to a notification event that should be provided to the parent device. The virtual bind system 402 can determine which device is the parent device managing a child device and transmit the notification to that device. The virtual bind system 402 can determine what activity corresponds to a notification event based on notification criteria set by the parent device or the network operator. The virtual bind system 402 can notify the parent through any appropriate technique. For example, the virtual bind system 402 can transmit a short message service (SMS) that is indicative of the activity associated with the subscriber on the child device to the parent device. The notification can include a push notification on the parent device. In some implementations, a user of the parent device does not need to access an application that can be used to monitor the child device to receive the notification. In this way, the parent device can be notified of relevant activity associated with a subscriber on the child device without having to independently monitor the device.

Figure 5:
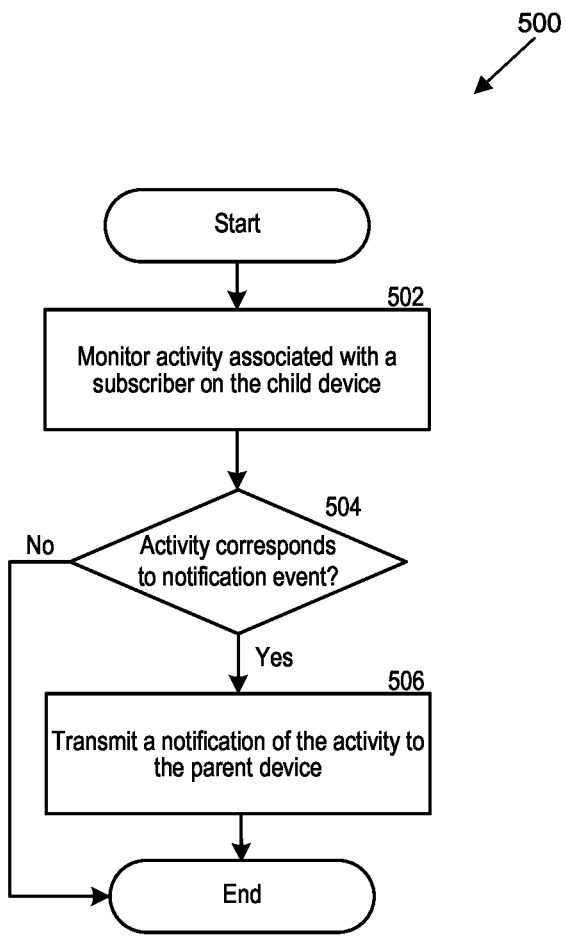
FIG. 5 is a block diagram that illustrates an example method for providing notifications on a managing device in accordance with one or more aspects of the present technology.

FIG. 5 is a block diagram that illustrates an example method 500 for providing notifications on a managing device in accordance with one or more aspects of the present technology. At 502, activity associated with a subscriber on a child device is monitored. This monitoring can include receiving information from network operator resources or device resources (e.g., as described in FIG. 4). Information related to creating a SIM on the child device can be stored in a database of the virtual bind system. The virtual bind system can continue to receive updated data related to activity that is associated with the subscriber on the child device.

At 504, the activity that is associated with the child device can be analyzed to determine if the activity corresponds to a notification event. The notification events can be defined by the notification settings of the parent device or the network operator. In some implementations, the notification events can include a billing event that relates to billing, by a mobile network operator, for services associated with the subscriber on the child device. For example, the virtual bind system can receive data that indicates that the subscriber on the child device has been disassociated with a billing profile that is billed, by the network operator, for services associated with the subscriber. The virtual bind system can determine that the subscriber has been unsubscribed to services provided by the network provider (e.g., calling, messaging, network access, etc.). In some implementations, the virtual bind system can determine that a billing profile associated with the subscriber on the child device has insufficient funds. In some implementations, the virtual bind system can determine that a billing profile associated with the subscriber on the child device has incurred additional charges. For example, the subscriber on the child device can initiate or receive an international call, go beyond a call, message, or data limit, or utilize any other service that results in additional charges. The notification events can include a SIM deletion event that deletes the SIM from the child device or a SIM management event that alters the subscriber on the child device to be at least partially managed by a subscriber on a third device. In some implementations, the notification events could correspond to events that disable the subscriber on the child device from communicating on the network, for example, if the SIM associated with the subscriber on the child device is deleted, if a billing profile is disconnected, or if a payment fails. In general, If the activity is determined to correspond to a notification event, the parent device is notified at 506. Otherwise, the virtual bind system can continue to monitor the activity associated with the subscriber on the child device without notifying the parent device.

At 506, activity associated with the subscriber on the child device is determined to correspond to a notification event, and a notification is transmitted to a parent device. The virtual bind system can determine which device or subscriber are the appropriate manager of a child device. For example, if a child device is managed by a first subscriber on a first parent device and the child device is later paired to a second parent device under a second subscriber, the first subscriber can be informed that the management of the child device has been changed. If subsequent activity is determined to correspond to a notification event, the virtual bind system can notify the second subscriber instead of or in addition to the first subscriber. In this way, the virtual bind system can track the relationship between devices to notify the appropriate parent device of activity on a child device.

Computer System

Figure 6:
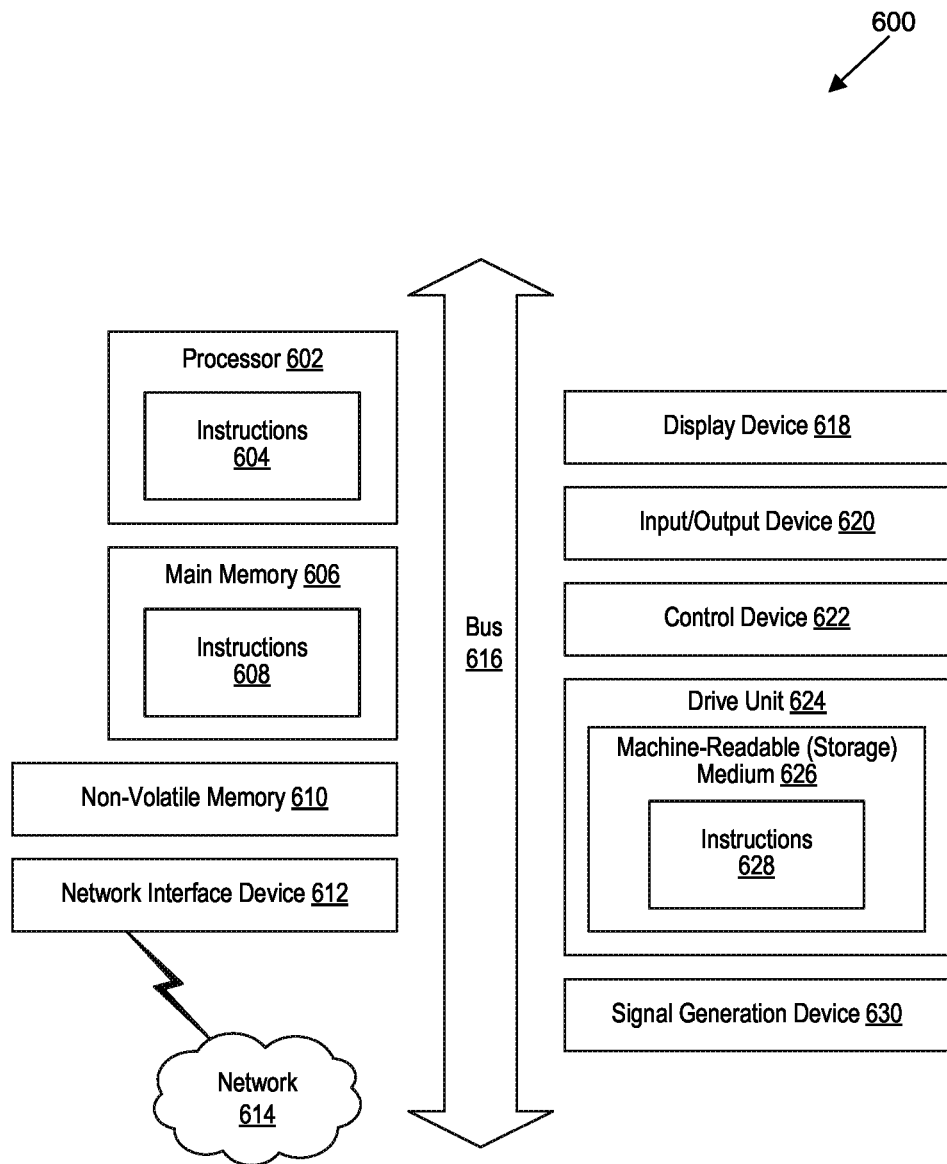
FIG. 6 is a block diagram that illustrates an example of a computer system in which at least some operations described herein can be implemented.

FIG. 6 is a block diagram that illustrates an example of a computer system 600 (e.g., the virtual bind system of FIG. 4) in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, PC, tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions, which, when executed by at least one data processor of a system, cause the system to:
obtain an indication that a second device is at least partially managing a first device,
wherein the second device and the first device are associated with a mobile network operator;
obtain an indication specifying an event associated with the first device that needs to be reported to the second device;
monitor activity associated with a first subscriber identity module (SIM) on the first device that is at least partially managed by a second SIM on the second device through a mobile network provided by the mobile network operator,
wherein the first SIM includes an embedded-SIM;
determine that the activity associated with the first SIM corresponds to a notification event comprising at least one of:
a billing event that relates to billing, by the mobile network operator, for services associated with the first SIM and provided by the mobile network operator;
a SIM deletion event that deletes the first SIM from the first device; or
a SIM management event that alters the first SIM to be at least partially managed by a third SIM on a third device; and
in response to the determination that the activity associated with the first SIM corresponds to the notification event, transmit a notification indicative of the activity associated with the first SIM to the second device having the second SIM.

2. The at least one non-transitory computer-readable storage medium of claim 1, wherein the system is further caused to:
obtain an indication that a device at least partially managing the first device has changed from the second device to a third device,
wherein the third device is associated with the mobile network subscriber;
determine that changing the device at least partially managing the first device from the second device to the third device corresponds to the notification event comprising the SIM management event; and
in response to the determination that changing the device at least partially managing the first device from the second device to the third device corresponds to the notification event comprising the SIM management event, transmit the notification indicative of the notification event to the second device,
wherein the notification indicates that the device at least partially managing the first device has changed to the third device.

3. The at least one non-transitory computer-readable storage medium of claim 1, wherein the system is further caused to:
obtain an indication that the first SIM is disassociated with a billing profile billed, by the mobile network operator, for services associated with the first SIM;
determine that the first SIM being disassociated with the billing profile corresponds to the notification event comprising the billing event; and
in response to the determination that the first SIM being disassociated with the billing profile corresponds to the notification event comprising the billing event, transmit the notification indicative of the notification event to the second device,
wherein the notification indicates that the first SIM has been disassociated with the billing profile.

4. The at least one non-transitory computer-readable storage medium of claim 1, wherein the system is further caused to:
obtain an indication that a billing profile billed, by the mobile network operator, for services associated with the first SIM has insufficient funds,
wherein the billing profile is different from an additional billing profile billed, by the mobile network operator, for services associated with the second SIM;

determine that the billing profile having insufficient funds corresponds to the notification event comprising the billing event; and in response to the determination that the billing profile having insufficient funds corresponds to the notification event comprising the billing event, transmit the notification indicative of the notification event to the second device, wherein the notification indicates that the billing profile has insufficient funds.

5. The at least one non-transitory computer-readable storage medium of claim 1, wherein the system is further caused to:

obtain an indication that an international call has been performed using the first device;

determine that the performance of the international call using the first device corresponds to the notification event comprising the billing event; and in response to the determination that the performance of the international call using the first device corresponds to the notification event comprising the billing event, transmit the notification indicative of the notification event to the second device, wherein the notification indicates that the international call has been performed using the first device.

6. The at least one non-transitory computer-readable storage medium of claim 1, wherein the system is further caused to:

obtain an indication that the first SIM has been deleted on the first device;

determine that the first SIM being deleted corresponds to the notification event comprising the SIM deletion event; and in response to the determination that the first SIM being deleted corresponds to the notification event comprising the SIM deletion event, transmit the notification indicative of the notification event to the second device, wherein the notification indicates that the first SIM has been deleted on the first device.

7. The at least one non-transitory computer-readable storage medium of claim 1, wherein the system is further caused to:

obtain an indication that the first SIM has been deleted on the first device, wherein the first SIM comprises an embedded SIM (eSIM) installed onto a universal integrated circuit card (UICC) of the first device;

determine that the first SIM being deleted corresponds to the notification event comprising the SIM deletion event; and in response to the determination that the first SIM being deleted corresponds to the notification event comprising the SIM deletion event:

transmit the notification indicative of the notification event to the second device, wherein the notification indicates that the first SIM has been deleted on the first device; and reinstall the eSIM onto the UICC of the first device.

8. The at least one non-transitory computer-readable storage medium of claim 1, wherein:

the first SIM comprises a first embedded SIM (eSIM) installed onto a first universal integrated circuit card (UICC) of the first device; or the second SIM comprises a second eSIM installed onto a second UICC of the second device.

9. The at least one non-transitory computer-readable storage medium of claim 1, wherein the first SIM is provisioned such that the first device has calling or messaging capability independent of the second device.

10. The at least one non-transitory computer-readable storage medium of claim 1, wherein the first device is paired to the second device such that calls or messages received on the first device are received at the second device.

11. A system comprising:

at least one hardware processor; and at least one non-transitory memory storing instructions, which, when executed by the at least one hardware processor, cause the system to:

monitor activity associated with a first subscriber identity module (SIM) on a first user equipment (UE) that is at least partially managed by a second SIM on a second UE through a mobile network provided by a mobile network operator;

determine that the activity associated with the first SIM corresponds to a notification event comprising:

a billing event that relates to billing, by the mobile network operator, for services associated with the first SIM and provided by the mobile network operator;

a SIM deletion event that deletes the first SIM from the first UE; or a SIM management event that alters the first SIM to be at least partially managed by a third SIM on a third UE; and in response to the determination that the activity associated with the first SIM corresponds to the notification event, transmit a notification indicative of the activity associated with the first SIM to the second UE having the second SIM.

12. The system of claim 11, wherein the system is further caused to:

obtain an indication that the first SIM is disassociated with a billing profile billed, by the mobile network operator, for services associated with the first SIM;

determine that the first SIM being disassociated with the billing profile corresponds to the notification event comprising the billing event; and in response to the determination that the first SIM being disassociated with the billing profile corresponds to the notification event comprising the billing event, transmit the notification indicative of the notification event to the second UE, wherein the notification indicates that the first SIM has been disassociated with the billing profile.

13. The system of claim 11, wherein the system is further caused to:

obtain an indication that a billing profile billed, by the mobile network operator, for services associated with the first SIM has insufficient funds, wherein the billing profile is different from an additional billing profile billed, by the mobile network operator, for services associated with the second SIM;

determine that the billing profile having insufficient funds corresponds to the notification event comprising the billing event; and in response to the determination that the billing profile having insufficient funds corresponds to the notification event comprising the billing event, transmit the notification indicative of the notification event to the second UE, wherein the notification indicates that the billing profile has insufficient funds.

14. The system of claim 11, wherein the system is further caused to:
    obtain an indication that an international call has been performed using the first UE;
    determine that the performance of the international call using the first UE corresponds to the notification event comprising the billing event; and
    in response to the determination that the performance of the international call using the first UE corresponds to the notification event comprising the billing event, transmit the notification indicative of the notification event to the second UE,
        wherein the notification indicates that the international call has been performed using the first UE.

15. The system of claim 11, wherein the system is further caused to:
    obtain an indication that a UE at least partially managing the first UE has changed from the second UE to a third UE,
        wherein the third UE is associated with the mobile network subscriber;
    determine that changing the UE at least partially managing the first UE from the second UE to the third UE corresponds to the notification event comprising the SIM management event; and
    in response to the determination that changing the UE at least partially managing the first UE from the second UE to the third UE corresponds to the notification event comprising the SIM management event, transmit the notification indicative of the notification event to the second UE,
        wherein the notification indicates that the UE at least partially managing the first UE has changed to the third UE.

16. The system of claim 11, wherein the first UE is paired with the second UE through a mobile network provided by the mobile network operator, the first SIM and the second SIM being subscribed to the mobile network operator.

17. The system of claim 11, wherein:
    the first UE comprises a wearable UE; and
    the second UE comprises a mobile UE.

18. The system of claim 11, wherein monitoring the activity associated with the first SIM includes monitoring a billing system of the mobile network operator.

19. The system of claim 11, wherein transmission of the notification indicative of the activity associated with the first SIM to the second UE having the second SIM is based on a notification setting associated with the second SIM or the second UE.

20. A system comprising:
    at least one hardware processor; and
    a virtual bind module configured to:
        store information related to creating a first subscriber identity module (SIM) on a first user equipment (UE) that is at least partially managed by a second SIM on a second UE, the first UE enabled to communicate on a mobile network provided by a mobile network operator;
        store updated information related to activity that is associated with the first SIM;
        determine, based on the updated information, that the first UE is no longer able to communicate on the mobile network; and
        in response to the determination that the first UE is no longer able to communicate on the mobile network, transmit, to the second UE having the second SIM, a notification that the first UE is no longer able to communicate on the mobile network.

* * * * *